S. L. TERRY.
AUTOMOBILE LOCK.
APPLICATION FILED JUNE 2, 1915.

1,180,801.

Patented Apr. 25, 1916.

Witnesses

Samuel L. Terry, Inventor

Attorneys

UNITED STATES PATENT OFFICE.

SAMUEL L. TERRY, OF CHICAGO, ILLINOIS.

AUTOMOBILE-LOCK.

1,180,801.  Specification of Letters Patent.  Patented Apr. 25, 1916.

Application filed June 2, 1915. Serial No. 31,710.

*To all whom it may concern:*

Be it known that I, SAMUEL L. TERRY, a citizen of the United States, residing at Chicago, in the county of Cook and State of Illinois, have invented a new and useful Automobile-Lock, of which the following is a specification.

The present invention is a locking device adapted especially for use in automobiles or motor vehicles, for locking the steering gear thereof, so that the automobile cannot be successfully operated by unwarranted persons.

It is the object of the invention to provide a novel and improved means for locking the steering gear of an automobile, whereby the steering gear cannot be moved for purpose of steering the vehicle, and which renders it impossible to operate the automobile until the steering gear is released, since it is necessary for the operation of the automobile, that the steering gear can be manipulated.

It is also within the scope of the invention to provide a locking mechanism of the nature indicated which is comparatively simple, and inexpensive in construction, which may be readily installed upon various automobiles, and which will serve its office in a thoroughly practical, convenient and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
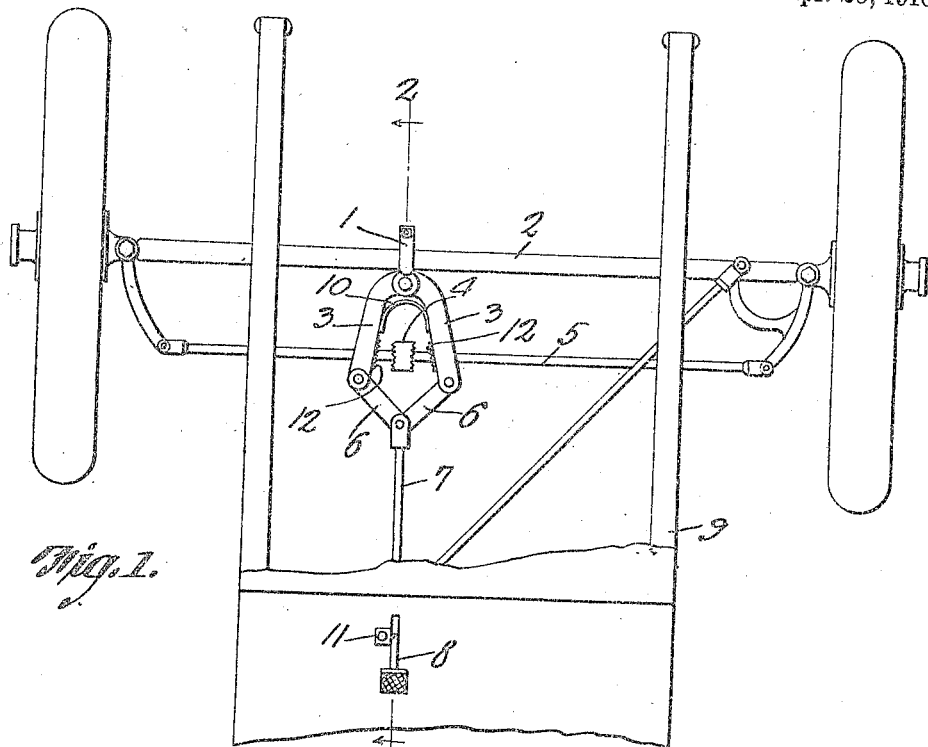
Figure 2:
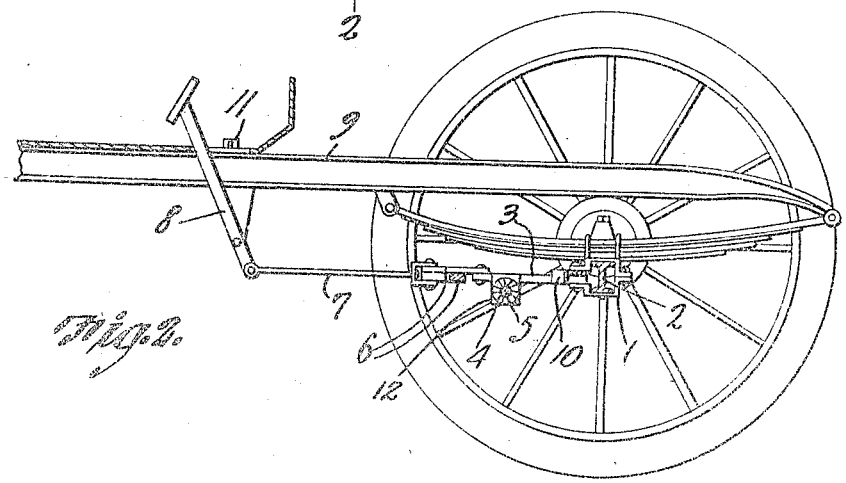

Figure 1 is a plan view of a fragmental portion of an automobile illustrating the locking device applied thereto. Fig. 2 is a longitudinal section taken on the line 2—2 of Fig. 1.

In carrying out the invention, a suitable bracket or clip 1 is attached to the front axle 2 of the vehicle, and a pair of diverging jaws or arms 3 are pivoted by a common pivot to the bracket or clip 1, and the jaws 3 are located upon opposite sides of a block or member 4 secured upon the steering rod 5. The jaws or arms 3 project past the steering rod 5, and a pair of toggle links 6 have their remote ends pivoted to the free ends of the jaws 3, while the adjacent ends of the links 6 are connected to one end of a connecting rod 7. The other end of the connecting rod 7 is pivoted to a foot lever 8 fulcrumed to the chassis or frame 9 of the vehicle adjacent the dash or at any other suitable point, whereby the lever 8 may be readily swung by the foot of the operator when the operator leaves the car. It will be understood, however, that the foot lever 8 may be replaced by any other suitable actuating member for operating the locking device.

A spring is disposed between the jaws or arms 3 for separating them when they are released, and a permutation or key controlled lock 11 is carried by the chassis or frame and coöperates with the lever 8 to hold the said lever when it is swung to set the device for locking the steering gear.

The jaws 3 have toothed portions 12 between their ends loosely engaging the steering rod 5 and adapted to engage the toothed ends of the lock 4 when the jaws 3 are swung toward one another.

The present device may be readily installed in various motor vehicles, and may be made in various sizes or may be adjustable, for that purpose. The device may also be manufactured inexpensively and provides a cheap and desirable locking means for the car.

Ordinarily, the lever 8 is released so that the jaws 3 are separated under the influence of the spring 10, to allow the block 4 to move freely between the jaws 3 when the steering rod 5 is reciprocated for steering the vehicle. When the operator leaves the car, and desires to lock the same, he presses the foot lever 8 so as to pull the connecting rod 7 therewith, and the toggle links 6 will then be pulled with the rod 7 to swing the jaws or arms 3 toward one another. The jaws 3 will then grip the block 4, and as a result, the steering gear will be prevented from moving. When the foot lever 8 is swung, it will be engaged by the lock 11, to prevent the lever 8 from being released unless the lock 11 can be operated by the proper combination or key for releasing the lever 8. The steering gear is thus locked in a simple yet effective manner for preventing the successful operation of the car by unwarranted or maliciously inclined persons.

The present locking device is out of the way, and does not objectionably encumber the vehicle, and at the same time, serve its function in an admirable manner The present lock may not only be employed for locking the steering gear, but may be employed upon various portions of the car for holding a member against movement, so that the car cannot be operated while locked.

Having thus described the invention, what is claimed as new is:

1. In a locking device, a bracket, a pair of diverging jaws pivoted to the bracket, a pair of toggle links pivoted to said jaws, means connected to said links for swinging the jaws to grip a member therebetween, and means for locking said means.

2. In a locking device, a bracket, a pair of diverging jaws pivoted thereto to grip a member therebetween, a pair of toggle links pivoted to the jaws, an actuating member, a connecting rod connecting said actuating member and toggle links, and means adapted to lock said actuating member.

3. In a locking device, a bracket, a pair of diverging jaws pivoted to the bracket, means operatively engaged to the free ends of said jaws for swinging them toward and away from one another, and means for locking said means, the jaws having means between their ends for gripping the movable member therebetween.

4. The combination with a motor vehicle, of a pair of jaws pivoted to one portion thereof, a member carried by a movable portion of the vehicle and disposed between said jaws, actuating means operatively engaged to the free ends of the jaws, and means for locking said actuating means, the jaws having means between their ends for gripping said member.

5. The combination with a motor vehicle, of a pair of jaws pivoted to a portion thereof, a member carried by a movable portion of the vehicle and disposed between said jaws, toggle links pivoted to the jaws, an actuating member connected to said links, and a lock for holding said actuating member when it is moved to swing the jaws toward one another.

In testimony that I claim the foregoing as my own, I have hereto affixed my signature in the presence of two witnesses.

SAMUEL L. TERRY.

Witnesses:
JAMES S. BURTON,
CHAS. W. LAMBORN.